(12) United States Patent
Feddema et al.

(10) Patent No.: US 12,137,859 B2
(45) Date of Patent: *Nov. 12, 2024

(54) DISHWASHER FILTER ASSEMBLY

(71) Applicant: WHIRLPOOL CORPORATION, Benton Harbor, MI (US)

(72) Inventors: Mark S. Feddema, Kalamazoo, MI (US); Antony Mark Rappette, Benton Harbor, MI (US); Lisa M. Fehner, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/181,145

(22) Filed: Mar. 9, 2023

(65) Prior Publication Data

US 2023/0200618 A1 Jun. 29, 2023

Related U.S. Application Data

(63) Continuation of application No. 17/084,267, filed on Oct. 29, 2020, now Pat. No. 11,622,667, which is a continuation of application No. 15/719,744, filed on Sep. 29, 2017, now Pat. No. 10,835,100.

(51) Int. Cl.
| | |
|---|---|
| *A47L 15/42* | (2006.01) |
| *B01D 33/073* | (2006.01) |
| *B01D 33/46* | (2006.01) |
| *A47L 15/46* | (2006.01) |

(52) U.S. Cl.
CPC ........ *A47L 15/4208* (2013.01); *B01D 33/073* (2013.01); *B01D 33/46* (2013.01); *B01D 33/461* (2013.01); *A47L 15/4206* (2013.01); *A47L 15/46* (2013.01)

(58) Field of Classification Search
CPC .. A47L 15/4208; B01D 33/461; B01D 33/073
See application file for complete search history.

(56) References Cited

U.S. PATENT DOCUMENTS

| | | | |
|---|---|---|---|
| 3,784,017 | A | 1/1974 | Arnold et al. |
| 5,143,306 | A | 9/1992 | Nilsson |
| 5,628,334 | A | 5/1997 | Edwards et al. |
| 7,594,513 | B2 | 9/2009 | VanderRoest et al. |

(Continued)

FOREIGN PATENT DOCUMENTS

| | | |
|---|---|---|
| DE | 10252679 A1 | 5/2004 |
| EP | 2653088 A1 | 10/2013 |
| KR | 20120129266 A | 11/2012 |

*Primary Examiner* — Joseph L. Perrin
*Assistant Examiner* — Kevin G Lee
(74) *Attorney, Agent, or Firm* — McGarry Bair PC

(57) ABSTRACT

A dishwasher includes a tub with an access opening to a treating chamber, a sump, at least one sprayer emitting liquid into the treating chamber, a pump, a conduit fluidly coupling the sump to the pump and the pump to the at least one sprayer, thereby defining a recirculation circuit through which the liquid sprayed into the treating chamber collects in the sump and is pumped back to the at least one sprayer. The dishwasher also includes a filter assembly in the sump for filtering the liquid in the recirculation circuit including a cleaning element and a dome shaped displacement body positioned adjacent the filter wall for raising a liquid level within the filter and configured to fill more than 50% of a percentage of a volume of the filter.

16 Claims, 5 Drawing Sheets

(56) References Cited

U.S. PATENT DOCUMENTS

| | | |
|---|---|---|
| 8,707,973 B2 | 4/2014 | Yoon et al. |
| 8,776,808 B2 | 7/2014 | Fountain et al. |
| 8,834,647 B2 | 9/2014 | Gnadinger et al. |
| 9,005,369 B2 | 4/2015 | Delgado et al. |
| 2010/0154841 A1 | 6/2010 | Fountain et al. |
| 2010/0224223 A1 | 9/2010 | Kehl et al. |
| 2011/0146731 A1 | 6/2011 | Fountain et al. |
| 2012/0060874 A1 | 3/2012 | Gnadinger et al. |
| 2013/0019899 A1 | 1/2013 | Yoon et al. |
| 2014/0109938 A1 | 4/2014 | Geba et al. |
| 2015/0148883 A1 | 5/2015 | Hyodoh et al. |
| 2015/0201824 A1 | 7/2015 | Thiyagarajan et al. |
| 2015/0208895 A1 | 7/2015 | Lee et al. |
| 2018/0148883 A1 | 5/2018 | Rajendran et al. |

DISHWASHER FILTER ASSEMBLY

CROSS REFERENCE TO RELATED APPLICATIONS

This application is a Continuation application of U.S. patent application Ser. No. 17/084,267, filed Oct. 29, 2020, now issued as U.S. Pat. No. 11,622,667, on Apr. 11, 2023, which is a Continuation application of and claims priority to U.S. patent application Ser. No. 15/719,744, filed Sep. 29, 2017, now issued as U.S. Pat. No. 10,835,100, on Nov. 17, 2020, both of which are hereby incorporated herein by reference in their entirety.

BACKGROUND OF THE INVENTION

Contemporary automatic dishwashers for use in a typical household include a tub defining a treating chamber and a spraying system for recirculating liquid throughout the tub to remove soils from dishes and utensils. The liquid can drain into a pump and recirculate back to the tub via a recirculation circuit. The recirculation circuit can include a filter assembly in order to filter particulates from the liquid before it enters the tub. A dirty, or clogged filter assembly can cause the filter assembly to not efficiently filter the liquid.

BRIEF DESCRIPTION OF THE INVENTION

The present disclosure relates to a dishwasher including a tub at least partially defining a treating chamber with an access opening, a sump fluidly coupled to the treating chamber, at least one sprayer emitting liquid into the treating chamber, a pump, a conduit fluidly coupling the sump to the pump and the pump to the at least one sprayer, thereby defining a recirculation circuit through which the liquid sprayed into the treating chamber collects in the sump and is pumped back to the at least one sprayer, and a filter assembly provided in the sump and filtering the liquid in the recirculation circuit. The filter assembly including a filter having a filter wall through which the liquid passes, and a dome shaped displacement body positioned adjacent the filter wall for raising a liquid level within the filter and configured to fill more than 50% of a percentage of a volume of the filter.

DESCRIPTION OF EMBODIMENTS OF THE INVENTION

While this description will reference many different features for a dishwasher, one beneficial and advantageous feature is a filter assembly that includes a cleaning element for a filter. The cleaning element improves filter assembly function by removing food particles to allow for continual flow of fluid though the filter. Another advantageous feature is a filter assembly that includes a displacement body. The displacement body raises the water level within the filter assembly. Many dishwashers are run with low water amounts in order to save water and reduce energy levels. Thus, the displacement body can provide more efficient filtering of fluid by creating a higher water level in the filter assembly in order for fluid to flow into the filter.

Figure 1:
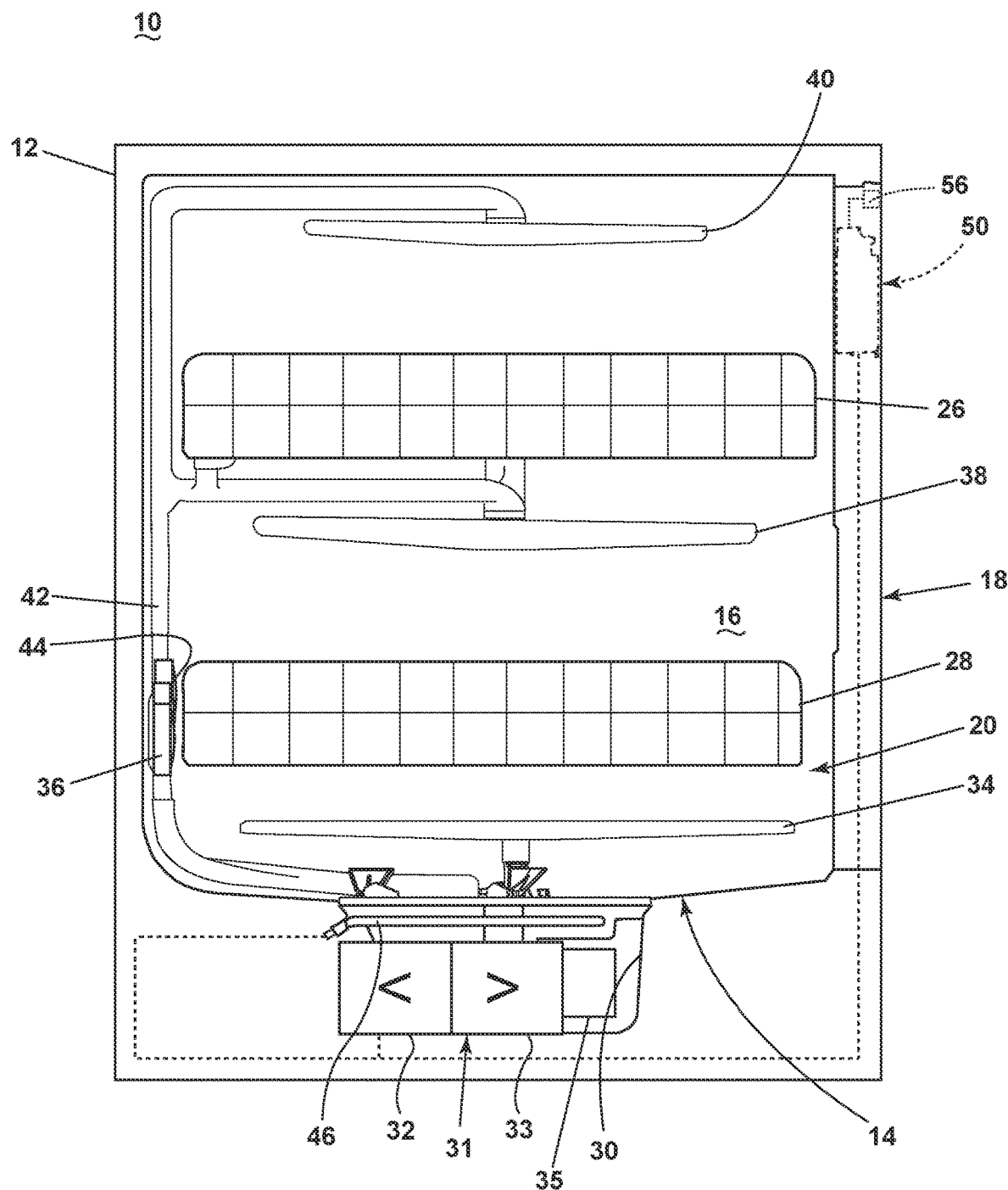
FIG. 1 is a schematic, cross-sectional view of a dishwasher according to an aspect of the present disclosure.

In FIG. 1, an automated dishwasher 10 according to aspects of the present disclosure is illustrated. The dishwasher 10 shares many features of a conventional automated dishwasher, which will not be described in detail herein except as necessary for a complete understanding. A chassis 12 can define an interior of the dishwasher 10, including a space below the tub 14 and can include a frame, with or without panels mounted to the frame. An open-faced tub 14 can be provided within the chassis 12 and can at least partially define a treating chamber 16, having an open face, for washing dishes. A door assembly 18 can be movably mounted to the dishwasher 10 for movement between opened and closed positions to selectively open and close the open face of the tub 14. Thus, the door assembly 18 provides accessibility via an access opening 20 to the treating chamber 16 for the loading and unloading of dishes or other washable items.

It should be appreciated that the door assembly 18 can be secured to the lower front edge of the chassis 12 or to the lower front edge of the tub 14 via a hinge assembly (not shown) configured to pivot the door assembly 18. When the door assembly 18 is closed, user access to the treating chamber 16 can be prevented, whereas user access to the treating chamber 16 can be permitted when the door assembly 18 is open.

A dish rack assembly, illustrated in the form of upper and lower dish racks 26, 28, is located within the treating chamber 16 and receives dishes for washing. The upper and lower racks 26, 28 are typically mounted for slidable movement in and out of the treating chamber 16 for ease of loading and unloading. The upper and lower dish racks 26, 28 can be in the form of a wire frame rack. Other dish holders can be provided, such as a silverware basket. As used in this description, the term "dish(es)" is intended to be generic to any item, single or plural, that can be treated in the dishwasher 10, including, without limitation, dishes, plates, pots, bowls, pans, glassware, and silverware. While the dishwasher 10 is shown with two dish racks, any number of dish racks can be included.

A spray system is provided for spraying liquid in the treating chamber 16 and is provided in the form of a first lower spray assembly 34, a second lower spray assembly 36, a rotating mid-level spray arm assembly 38, and/or an upper spray arm assembly 40. Upper sprayer 40, mid-level rotatable sprayer 38 and lower rotatable sprayer 34 are located, respectively, above the upper rack 26, beneath the upper rack 26, and beneath the lower rack 28 and are illustrated as rotating spray arms. The second lower spray assembly 36 is illustrated as being located adjacent the lower dish rack 28 toward the rear of the treating chamber 16. The second lower spray assembly 36 is illustrated as including a vertically oriented distribution header or spray manifold 44. Such a spray manifold is set forth in detail in U.S. Pat. No. 7,594,513, issued Sep. 29, 2009, and titled "Multiple Wash Zone Dishwasher," which is incorporated herein by reference in its entirety. The spray assemblies 34, 36, 38, 40 can be rotated by way of a motor or hydraulics.

A recirculation circuit, or recirculation system is provided for recirculating liquid from the treating chamber 16 to the spray system. The recirculation system can include a sump 30 and a pump assembly 31. The sump 30 collects the liquid sprayed in the treating chamber 16 and can be formed by a sloped or recess portion of a bottom wall of the tub 14. A filter assembly 35 provided in the sump 30 can filter the liquid in the recirculation system. The pump assembly 31 can include both a drain pump 32 and a recirculation pump 33. The drain pump 32 can draw liquid from the sump 30 and pump the liquid out of the dishwasher 10 to a household drain line (not shown). The recirculation pump 33 can draw liquid from the sump 30 and the liquid can be simultaneously or selectively pumped through a conduit, such as a supply tube 42 to each of the assemblies 34, 36, 38, 40 for selective spraying. The filter assembly 35 filters out soils and prevent the soils from recirculating during the wash. During draining the soils captured by the filter assembly 35 are removed with the drain water. While not shown, a liquid supply system can include a water supply conduit coupled with a household water supply for supplying water to the treating chamber 16. A heating system including a heater 46 can be located within the sump 30 for heating the liquid contained in the sump 30.

A controller 50 can also be included in the dishwasher 10, which can be operably coupled with various components of the dishwasher 10 to implement a cycle of operation. The controller 50 can be located within the door 18 as illustrated, or it can alternatively be located somewhere within the chassis 12. The controller 50 can also be operably coupled with a control panel or user interface 56 for receiving user-selected inputs and communicating information to the user. The user interface 56 can include operational controls such as dials, lights, switches, and displays enabling a user to input commands, such as a cycle of operation, to the controller 50 and receive information.

Figure 2:
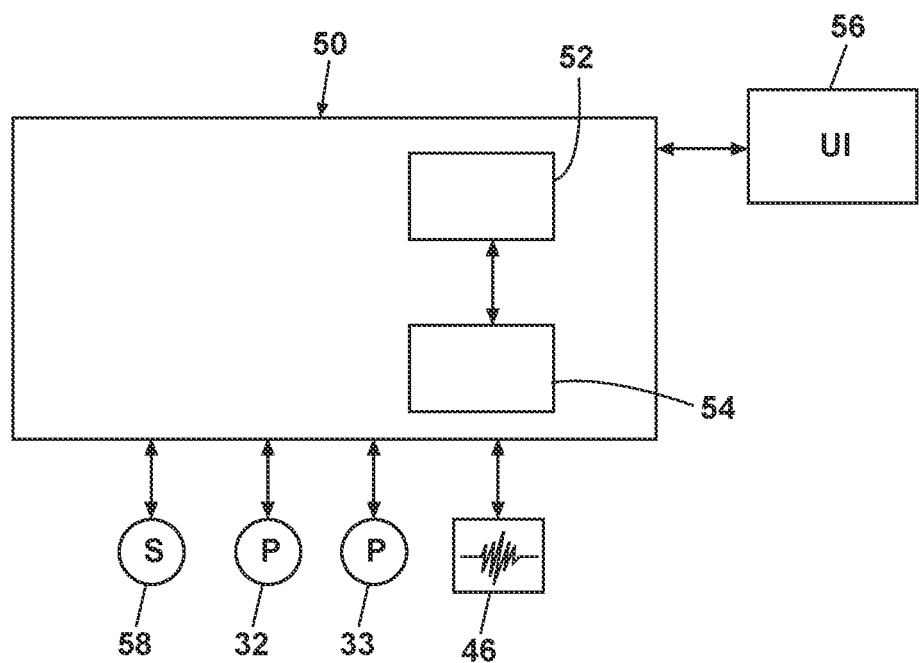
FIG. 2 is a schematic view of a controller of the dishwasher of FIG. 1.

As illustrated schematically in FIG. 2, the controller 50 can be coupled with the heater 46 for heating the wash liquid during a cycle of operation, the drain pump 32 for draining liquid from the treating chamber 16, and the recirculation pump 33 for recirculating the wash liquid during the cycle of operation. The controller 50 can be provided with a memory 52 and a central processing unit (CPU) 54. The memory 52 can be used for storing control software that can be executed by the CPU 54 in completing a cycle of operation using the dishwasher 10 and any additional software. For example, the memory 52 can store one or more pre-programmed cycles of operation that can be selected by a user and completed by the dishwasher 10. The controller 50 can also receive input from one or more sensors 58. Non-limiting examples of sensors that can be communicably coupled with the controller 50 include a temperature sensor and turbidity sensor to determine the soil load associated with a selected grouping of dishes, such as the dishes associated with a particular area of the treating chamber.

Figure 3:
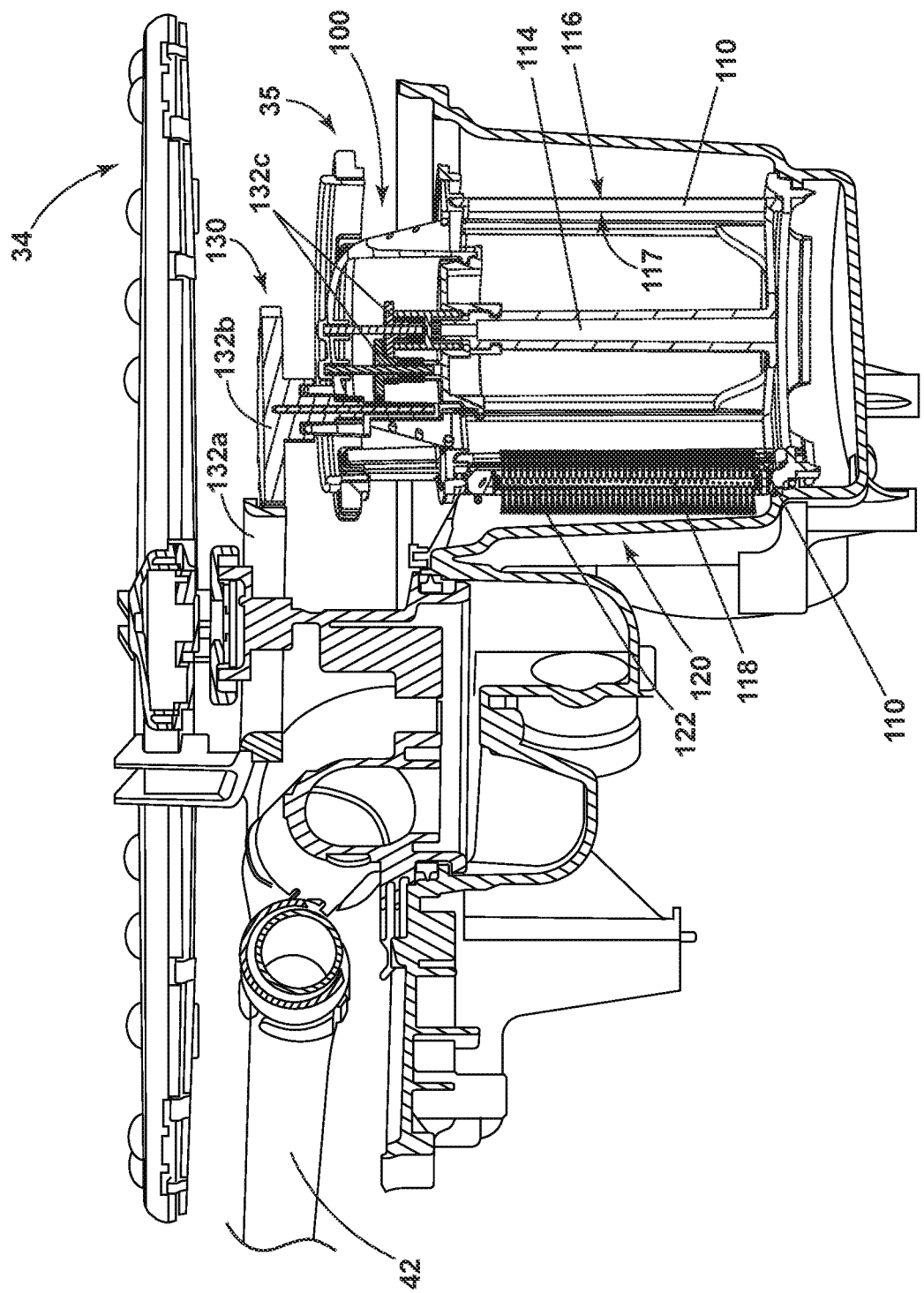
FIG. 3 is a side view of a sump and filter assembly according to aspects of the present disclosure.

FIG. 3 is a side view illustrating the sump 30 and filter assembly 35 of FIG. 1 in more detail. The filter assembly 35 includes a filter cup, or filter 100, a shaft 114, and a cleaning element 120 adjacent the filter 100. The filter 100 can include a perforated filter wall 110 formed of any suitable filtering material such as a mesh screen, for filtering wash liquid in the recirculation system. The filter wall 110 can include an outer surface 116 and inner surface 117. The cleaning element 120 can be in the form of a cleaning roller, brush, or scraper. The scraper can include a flexible polyester film, or a paddle made of any suitable material such as polypropylene. The cleaning element 120 is illustrated in FIG. 3 in the form of a roller 120 including a rotatable shaft 118 having protruding bristles 122 extending from the shaft 118. The bristles 122 can be formed of any suitable material such as nylon, and can have a diameter that is less than the diameter of perforations in the filter wall 110. As illustrated, the bristles 122 can contact and penetrate at least a portion of the outer surface 116 of the filter wall 110. However, it should be recognized that the cleaning element 120 can be positioned either adjacent to and in contact with either of the outer or inner surfaces 116, 117 of the filter wall 110, without limiting the scope of the disclosure.

In this exemplary illustration, the shaft 114 can be coupled to the filter wall 110 for rotating the filter wall 110 about cleaning element 120. Cleaning element 120 can be held stationary with respect to the rotating filter wall 110 such that the cleaning element 120 is in rotating contact with the outside surface 116 filter wall 110. In other words, the bristles 122 are free to rotate when in contact with the rotating filter wall 110 such that rotation of the filter wall 110 drives rotation of the cleaning element 120 about the outer surface 116 of the filter wall 110. While this embodiment shows the shaft 114 rotating the filter wall 110, it is also contemplated that the shaft 114 can be coupled to the cleaning element 120 instead of the filter wall 110. In this example, the filter wall 110 would remain stationary with respect to the cleaning element 120. The shaft 114 could drive the cleaning element 120 about the inner surface 117 of the filter wall 110 such that the cleaning element 120 would roll about the inner surface 117 of the filter wall 110.

In this exemplary illustration, a rotary driver can be coupled to the shaft 114 in order to rotate the shaft 114, which could be coupled to rotate either the filter wall 110 about the stationary cleaning element 120, or rotate the cleaning element 120 about the stationary filter wall 110. The rotary driver can be in the form of an electric motor (not shown) or spray arm, such as the rotatable sprayer 34. The sprayer 34 can be coupled to a gear reducing system 130 that can include gears 132a, 132b, and 132c. Gear 132a can be directly coupled to the sprayer 34 such that rotation of the sprayer 34 imparts rotation on gear 132a, thereby rotating gears 132b and 132c. The intermediate gear 132b can be positioned between gear 132a and reduction gears 132c, which can be coupled to the shaft 114. The gear reducing system 130 allows the shaft 114 to rotate at a much slower speed than the speed at which the sprayer 34 rotates. Thus, the filter wall 110 and cleaning element 120 can be rotated at speeds between about 1 to 4 revolutions per minute.

In operation, rotation of the filter wall 110 produces rolling contact of the cleaning element 120 with the filter wall 110 such that the bristles 122 rotate with rotatable shaft 118 and can penetrate the filter wall 110 thereby pushing particles, such as food, from the filter wall 110 in order to clean the filter wall 110. The bristles 122 are a suitable length such that the bristles are stiff, or rigid enough to penetrate the filter wall 110.

Figure 4:
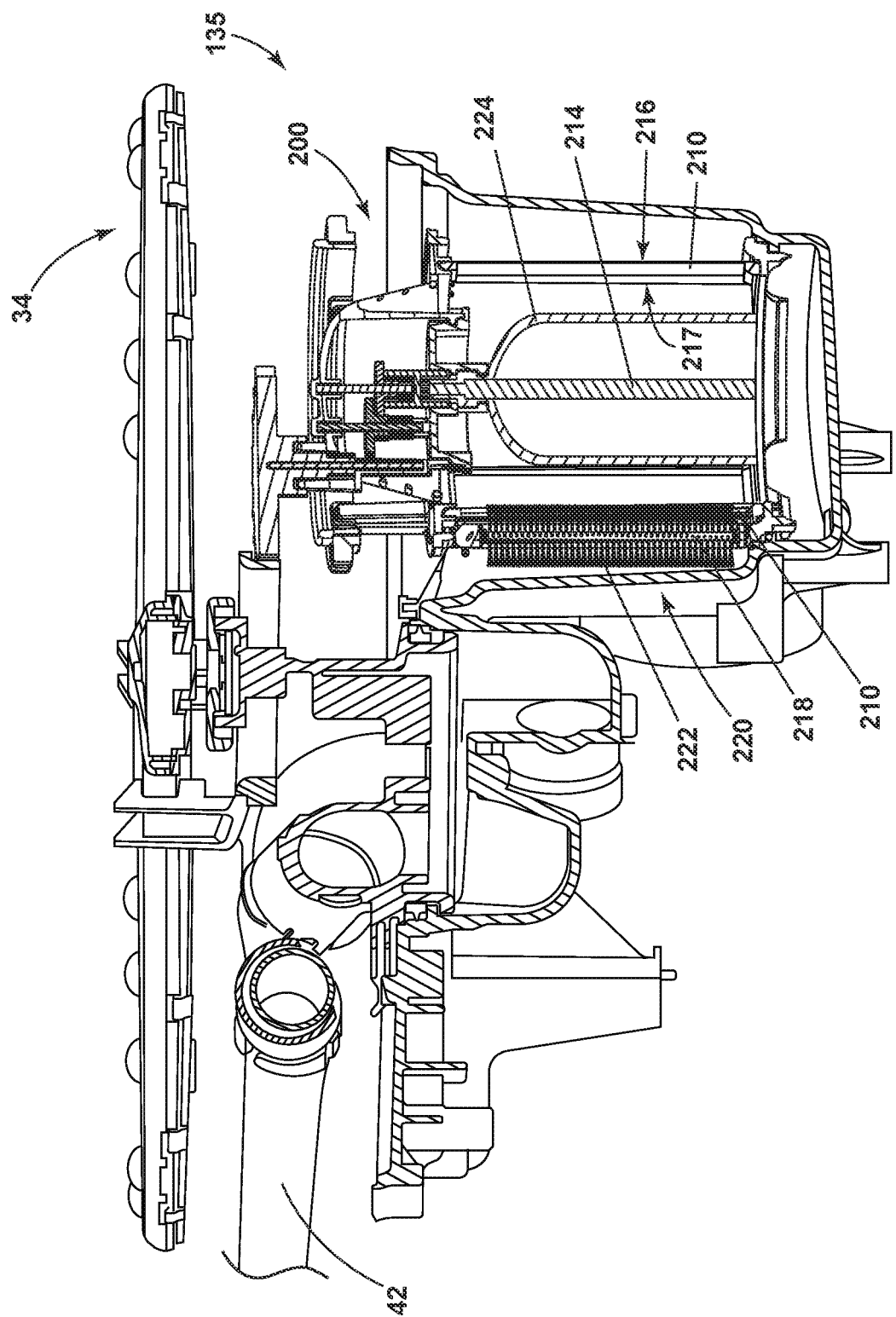
FIG. 4 is a side view of a filter assembly according to aspects of the present disclosure.

Turning to FIG. 4, another exemplary filter assembly 135 is shown in more detail. Since the filter assembly 135 is similar to the filter assembly 35; like parts will be identified with like numerals increased by 100, with it being understood that the description of the like parts of filter assembly 35 applies to filter assembly 135, unless otherwise noted.

The filter assembly 135 can include a displacement body 224 positioned adjacent an inner surface 217 of the filter 210 such that the displacement body 224 is located within the filter 200. The displacement body 224 can couple with the shaft 214, or function as the shaft 214. The cleaning element 220 can be in the form of a cleaning roller, brush, or scraper.

The shaft 214, or displacement body 224, can be coupled to the filter wall 210 for rotating the filter wall 210 about cleaning element 220. Cleaning element 220 can be held stationary with respect to the rotating filter wall 210 such that the cleaning element 220 is in rotating contact with the outside surface 216 of the filter wall 210. If the displacement body 224 is housed in the shaft 214, then, like the previous illustration, the displacement body 224 can rotate the filter wall 210, or displacement body 224 can be coupled to the cleaning element 220 instead of the filter wall 210. In this example, the filter wall 210 would remain stationary with respect to the cleaning element 220. The displacement body 224 could drive the cleaning element 220 about the inner surface 217 of the filter wall 210 such that the cleaning element 220 would roll about the inner surface 217 of the filter wall 210.

The displacement body 224 can be coupled with a rotary driver to rotate either the filter wall 210 about the stationary cleaning element 220 or rotate the cleaning element 220 about the stationary filter wall 210. The displacement body 224 can be hollow, or in the form of an air dome capable of trapping air, thereby displacing liquid in the filter 210 and raising the liquid level. The displacement body 224 can fill a portion of the volume within the filter 210. For example, the displacement body 224 can fill, or occupy, a percentage of the volume of the filter 210, preferably more than 50%. It should be recognized that the displacement body 224 could be independent of the shaft 214 and the filter wall 210 and simply be a separate element located in the sump without departing from the scope of the disclosure.

Figure 5:
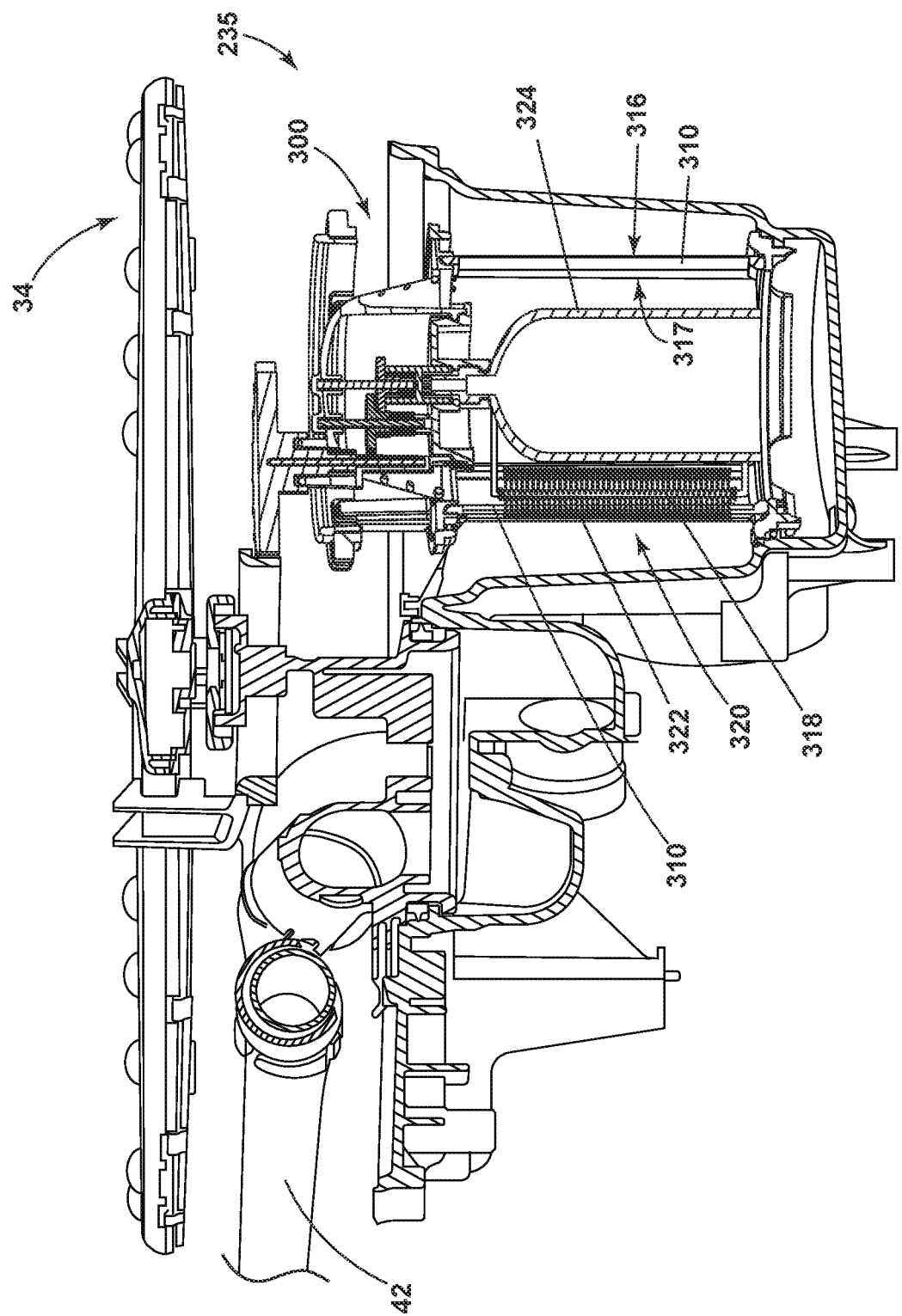
FIG. 5 is a side view of a filter assembly according to aspects of the present disclosure.

Turning to FIG. 5, another exemplary filter assembly 235 is shown in more detail. Since the filter assembly 235 is similar to the filter assembly 135; like parts will be identified with like numerals increased by 100, with it being understood that the description of the like parts of filter assembly 135 applies to filter assembly 235, unless otherwise noted.

The filter assembly 235 includes a cleaning element 320 secured to the displacement body 324. It is possible that the shaft 318 of the cleaning element 320 is configured to directly couple with the displacement body 324. The cleaning element 320 can be in the form of a cleaning roller, brush, or scraper. FIG. 5 illustrates the cleaning element 320 in the form of a roller 320. The cleaning element 320 can contact the filter wall 310 in order to clean the filter wall 310. The cleaning element 320 can also be designed to raise the liquid level within the filter assembly 235. For example, the cleaning element 320 can include a hollow shaft 318 that can displace water.

The aspects of the disclosure described herein can be used to clean a filter for a recirculation system in a dishwasher, ensuring that the filter operates efficiently. Aspects of the disclosure can improve filter assembly function by allowing continual flow of fluid through the filter. Some soils that get past a fine filter might get caught on the back side of a micro filter, but that is not a desired result. Aspects described herein can dislodge these soils if they are captured in the filter. Additionally, filter assembly function can also be improved by the inclusion of a displacement body in the filter assembly. Since many dishwashers are run with low water amounts in order to save water and reduce energy levels, the displacement body can provide more efficient filtering of fluid by creating a higher water level in the filter assembly in order for fluid to flow into the filter.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. For example, it is possible for the filter assembly to include a cleaning element adjacent the outside surface of the filter in addition to a cleaning element adjacent the inside surface of the filter.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

The invention claimed is:

1. A dishwasher comprising:
a tub at least partially defining a treating chamber with an access opening;
a sump fluidly coupled to the treating chamber;
at least one sprayer emitting liquid into the treating chamber;
a pump;
a conduit fluidly coupling the sump to the pump and the pump to the at least one sprayer, thereby defining a recirculation circuit through which the liquid sprayed into the treating chamber collects in the sump and is pumped back to the at least one sprayer;
a filter assembly provided in the sump and filtering the liquid in the recirculation circuit and comprising a filter having a filter wall through which the liquid passes;
a displacement body positioned adjacent the filter wall for raising a liquid level within the filter and configured to fill more than 50% of a percentage of a volume of the filter and wherein the displacement body is configured to rotate the filter wall; and
one of a cleaning roller, brush, or scraper secured to the displacement body.

2. The dishwasher of claim 1, wherein the filter wall comprises a first end and second end and with an inside and outside surface extending between the first and second end through which the liquid passes.

3. The dishwasher of claim 1, further comprising a cleaning element for cleaning the filter wall.

4. The dishwasher of claim 3, wherein the cleaning element is in contact with the filter wall.

5. The dishwasher of claim 4, wherein the cleaning element is in rotating contact with the filter wall.

6. The dishwasher of claim 3, wherein the cleaning element extends vertically between a first and second end of the filter wall.

7. The dishwasher of claim 1, further comprising a rotary driver coupled to the displacement body for rotating the displacement body.

8. The dishwasher of claim 7, wherein the rotary driver is a dishwasher spray arm.

9. The dishwasher of claim 1, further comprising protruding bristles from the brush and protruding through at least a portion of the filter wall.

10. The dishwasher of claim 1, wherein the displacement body is one of hollow or an air dome.

11. The dishwasher of claim 1, further comprising a rotary driver for rotating a cleaning element.

12. The dishwasher of claim 11, further comprising a shaft coupling the rotary driver to the cleaning element.

13. The dishwasher of claim 12, further comprising a gear reducing system coupling the shaft to the rotary driver.

14. The dishwasher of claim 11, wherein the rotary driver drives rotation of the filter wall via the displacement body and rotation of the filter wall drives rotation of the cleaning element about an outer surface of the filter wall.

15. The dishwasher of claim 11, wherein one of the cleaning element or filter wall rotates between about 1 to 4 revolutions per minute.

16. The dishwasher of claim 1, wherein the filter wall is a mesh screen.

* * * * *